May 20, 1969      R. ERIKSSON      3,444,766

COUNTERSINKING AND COUNTERBORING TOOLS

Filed May 8, 1967

R. Eriksson, INVENTOR.

By Richards & Geier

ATTORNEYS

United States Patent Office 3,444,766
Patented May 20, 1969

1

3,444,766
COUNTERSINKING AND COUNTERBORING TOOLS
Ragnar Eriksson, Pepparvagen 18, Forsta, Sweden
Filed May 8, 1967, Ser. No. 636,776
Int. Cl. B23b 11/10; B23d 77/00
U.S. Cl. 77—73.5                               1 Claim

ABSTRACT OF THE DISCLOSURE

A rotatable cutting tool having a shank portion, an intermediate portion and a body portion. The body portion is eccentric relative to the shank and the intermediate portion. The body portion includes a countersinking and counterboring portion wherein the countersinking portion has a spirally generated bevel surface with a chip receiving bore penetrating and opening into both the intermediate portion and the generated bevel portion.

---

The present invention relates to new and useful improvements in countersinking and counterboring tools of the kind having a cylindrical or annular tool body connected with a chuck engaging driving shank and further a spirally generated beveled surface which is arranged at the desired angle for which the tool is designed to countersink and a shaving receiving opening or bore intersecting and opening out into such surface to provide an improved shear action cutting edge having the necessary relief or cutting clearance, in which the shaving receiving opening penetrates not only the spirally generated surface but also the cylindrical surface of the tool body.

An important object of a tool of the above character for countersinking and counterboring holes is to effectively remove burrs from the edges of hole and the workpiece.

Other objects may be had by referring to the following description and claim, taken in conjunction with the accompanying drawing, in which:

Figure 2:
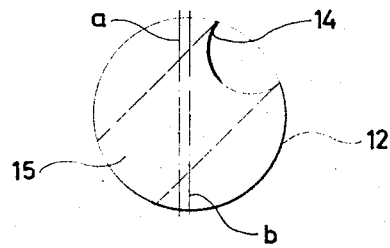
FIG. 2 is an end elevation thereof looking from direction of the line 2—2 of FIGURE 1.
Figure 1:
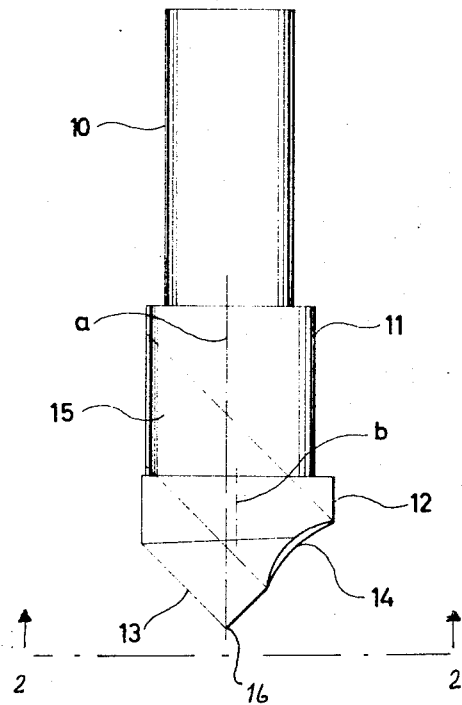
FIG. 1 is a side view of the improved tool.

Referring now to the drawing, the numeral 10 designates a chuck engaging driving shank having a cylindrical or annular intermediate body 11. Said intermediate body 11 having a tool body 12, of various shaped cross sections. The end of the tool body 12 opposite the intermediate part 11 is provided with a spirally generated beveled surface 13 which is arranged at a desired angle. A shaving receiving circular-section bore 15 extends through the tool at a certain angle to intersect and open out at its lower end and forming a curved countersinking cutting edge 14. Said bore also penetrates the major of the intermediate part 11 and opens out at its upper end. The tool body 12 has, compared with the intermediate part 11, a greater diameter and is arranged eccentrically relatively the intermediate part 11 and also the shank 10. Viewing FIGURE 1 it is obvious, that the front 16 of the tool body 12 is arranged in the center axis $a$ of the intermediate part 11 as well as of the shank 10, whereas the center axis $b$ of the tool body 12 is arranged eccentrically to the part 11 and the shank 10.

When a countersinking tool of conventional art is inserted in an older machine, where the spindle, depending on the normal wear, has a certain play, the countersinking work will be satisfactory or rather satisfactory. On the other hand, when a countersinking tool of conventional art is inserted in a new machine, where there is no such wear, the result of the countersinking work will not be satisfactory as burrs will appear in the workpiece which later must be removed. By improving the tools of described art so, that the front of the tool body is arranged in the center axis of the intermediate part 11 as well as of the shank 10 whereas the center axis of the tool body 12 is arranged eccentrically to the part 11 and the shank 10, it is possible to obtain a burrless surface of the workpiece notwithstanding the spindle of the machine has a play or not.

Although the invention has been described in a preferred form, it is understood that the disclosure has been made only by way of example and that changes in details of construction of parts can be made within the scope of the invention as thereinafter claimed.

What is claimed is:

1. A combined countersinking and counterboring tool comprising, a chuck engaging shank, an intermediate part and a tool body, said tool body having counterboring and countersinking portions and a front said countersinking portion having a spirally generated beveled surface, said surface having a shaving receiving bore penetrating and opening into both the surface of said intermediate part and said generated beveled surface, the opening of said bore in the beveled surface forming a curved countersinking cutting edge, said tool body having a greater extension than said intermediate part, said front of said tool body being arranged in the center axis of said intermediate part and said shank, the center axis of said tool body being eccentrically arranged relatively said center axis of said intermediate part and said shank.

References Cited

UNITED STATES PATENTS 2,829,543   4/1958   Bergstrom _____ 77—73.5

FRANCIS S. HUSAR, *Primary Examiner.*

U.S. Cl. X.R.

145—123